United States Patent
Adams et al.

(10) Patent No.: US 7,036,201 B2
(45) Date of Patent: May 2, 2006

(54) METHOD AND TOOL FOR ASSEMBLING A LINKED SUSPENSION

(75) Inventors: John Adams, Warren, MI (US); Chris Vineyard, Sylvan Lake, MI (US); James Kelchner, Royal Oak, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 470 days.

(21) Appl. No.: 10/306,551

(22) Filed: Nov. 26, 2002

(65) Prior Publication Data
US 2004/0100061 A1    May 27, 2004

(51) Int. Cl.
*B21D 39/00*    (2006.01)
*B23Q 3/00*    (2006.01)
(52) U.S. Cl. .......................... 29/452; 29/464
(58) Field of Classification Search .................. 29/450, 29/446, 452, 464; 280/124.134
See application file for complete search history.

(56) References Cited

U.S. PATENT DOCUMENTS 3,123,901 A * 3/1964 Traugott ....................... 29/263

* cited by examiner

*Primary Examiner*—Marc Jimenez
(74) *Attorney, Agent, or Firm*—Thomas A. Jurecko

(57) ABSTRACT

A method for assembling a linked suspension and an assembly tool for assembling a linked suspension are provided. The method includes positioning at least one bushing within a bracket, the bushing including an outer sleeve and a tube extending therethrough, the tube being rotatable with respect to the outer sleeve of the bushing against a counter-torque; rotating the tube with respect to the outer sleeve of the bushing; and tightening the bushing to the bracket after rotating the tube with respect to the outer sleeve.

10 Claims, 8 Drawing Sheets

METHOD AND TOOL FOR ASSEMBLING A LINKED SUSPENSION

FIELD OF THE INVENTION

The present invention relates to a method for assembling a linked suspension of a vehicle, as well as an assembly tool for assembling a linked suspension.

BACKGROUND INFORMATION

Referring to FIG. 1, there is seen a four-link suspension in a fully rebounded position. Four-link suspension 100 includes a bracket 110 fixedly coupled to a differential 115, through which a wheel axle 120 is rotatably mounted. Upper control arms 105a, 105b are provided for connecting the four-link suspension 100 to a car body 125a, 125b. For this purpose, the upper control arms 105a, 105b are fixedly and frictionally connected to respective bushings 140a, 140b, respective first ends of the upper control arms 105a, 105b being connected to a vehicle body 125a, 125b via respective body bolts 130a, 130b, and respective second ends of the upper control arms 105a, 105b being connected to the bracket 110 via respective bolts 135a, 135b.

Referring to FIG. 3, there is seen an exemplary bushing 300 including an outer sleeve 310 having a flat face flange 315 and a tube element 305 rotatably mounted therethrough, the tube element 305 including ends 305a, 305b and a bore 320 for receiving a bolt (not shown). A resilient material (not shown), for example, rubber, is disposed within outer sleeve 310, the resilient material being fixedly and frictionally engaged to the inside of the outer sleeve 310 and to the tube element 305. In this manner, the tube element 305 may be rotated with respect to the outer sleeve 310 against a counter torque produced by the resilient material, which opposes the rotation of the tube element 305 with respect to the outer sleeve 310.

During assembly of, for example, an automobile, the vehicle body 125a, 125b is suspended above an assembly area (not shown). As a result, the four-link suspension 100 drops below the car body 125a, 125b, and is held in place by shock absorbers (not shown), as shown in FIG. 1. Once the vehicle is suspended in this position (i.e., a fully rebounded position), an assembly person (not shown) may position himself underneath the four-link suspension 100 and secure bushings 140a, 140b to the bracket 110 via respective bolts 135a, 135b.

Once the respective bolts 135a, 135b are tightened, the automobile may be lowered from the suspended position, until the vehicle comes to rest on the ground via vehicle wheels (not shown), as shown in FIG. 2. Since the wheels are connected to the axle 120, the weight of the car body 125a, 125b exerts a force on the suspension springs (not shown), which causes upper control arms 105a, 105b to rotate downward in the direction of arrows 145a, 145b, respectively. This downward rotation of the upper control arms 105a, 105b causes the tube elements 305 of bushings 140a, 140b to rotate with respect to the respective outer sleeves 310.

As described above, the resilient material within the bushings 140a, 140b produces a force counteracting the rotation of the upper control arms 105a, 105b, thereby causing the tube elements 305 of the respective bushings 140a, 140b to become prestressed. It is believed that this may be disadvantageous in that the prestressing may cause a disadvantageous tighter ride and/or may ruin the bushings 140a, 140b, thereby rendering them inoperable.

To prevent these disadvantages, the wheels (not shown) may be lifted upward by a lifting device (not shown), while the vehicle is in the suspended position above the assembly area. This causes the four-link suspension 100 to be moved upward with respect to the stationary car body 125a, 125b, as shown in FIG. 2. In this manner, the lifting device (not shown) may simulate a ground force acting upon the wheels, while the car is suspended above the assembly area. Thus, the assembly person (not shown) may tighten bolts 135a, 135b, while the four-link suspension is pushed upward via the lifting device (not shown), thereby preventing the disadvantageous prestressing described above.

However, it is believed that this four-link suspension assembly method is disadvantageous in that operation of the lifting device (not shown) may be expensive, may be dangerous to the assembly person, and may consume additional assembly time by requiring that the four-link suspension 100 be lifted before attaching bushings 140a, 140b to the bracket 110.

SUMMARY OF THE INVENTION

It is an object of the present invention to provide a method and assembly tool for assembling a linked suspension, without need for a lifting device. For this purpose, a method is provided for assembling a linked suspension, including: positioning at least one bushing within a bracket, the bushing including an outer sleeve and a tube extending therethrough, the tube being rotatable with respect to the outer sleeve of the bushing against a counter-torque; rotating the tube with respect to the outer sleeve of the bushing; and tightening the bushing to the bracket after rotating the tube with respect to the outer sleeve.

It is another object of the present invention to provide the method described above, in which the at least one bushing includes a resilient material arranged within the outer sleeve and connected to the tube, the resilient material producing the counter-torque.

It is still another object of the present invention to provide the method described above, in which the resilient material includes rubber.

It is yet another object of the present invention to provide the method described above, in which the tube includes at least one of steel, aluminum, and a polymer.

It is still another object of the present invention to provide the method described above, in which the rotating of the tube with respect to the outer sleeve is performed using an assembly tool.

It is yet another object of the present invention to provide the method described above, in which the rotating of the tube with respect to the outer sleeve is performed while the linked suspension is in a fully rebounded state.

It is still another object of the present invention to provide the method described above, in which the outer sleeve of the bushing is kept essentially stationary via a control arm while the tube is rotated with respect to the outer sleeve.

It is yet another object of the present invention to provide the method described above, in which the tightening of the bushing to the bracket includes tightening a bolt positioned through the bracket and the tube of the bushing.

It is still another object of the present invention to provide the method described above, in which the rotating of the tube with respect to the outer sleeve is performed through a predefined angular degree.

It is yet another object of the present invention to provide the method described above, in which the predefined angular degree is 14 degrees.

It is still another object of the present invention to provide an assembly tool for assembling a linked suspension, including: a torque-producing arm having a connection end and a handle end; wherein the connection end of the torque-producing arm is configured to detachably couple to a tube of a bushing, the bushing including an outer sleeve and a tube extending therethrough, the tube being rotatable with respect to the outer sleeve of the bushing against a counter-torque.

It is still another object of the present invention to provide the assembly tool, further including an angular stop arrangement connected to the torque-producing arm, the angular stop arrangement configured to keep the assembly tool stationary with respect to the linked suspension after the assembly tool is rotated through a predefined angular degree.

It is yet another object of the present invention to provide the assembly tool, in which the angular stop arrangement includes a stop bar configured to rigidly and detachably engage with an upper control arm of the linked suspension.

It is still another object of the present invention to provide the assembly tool, in which the stop bar is rotatable with respect to the torque-producing arm.

DETAILED DESCRIPTION

Figure 1:
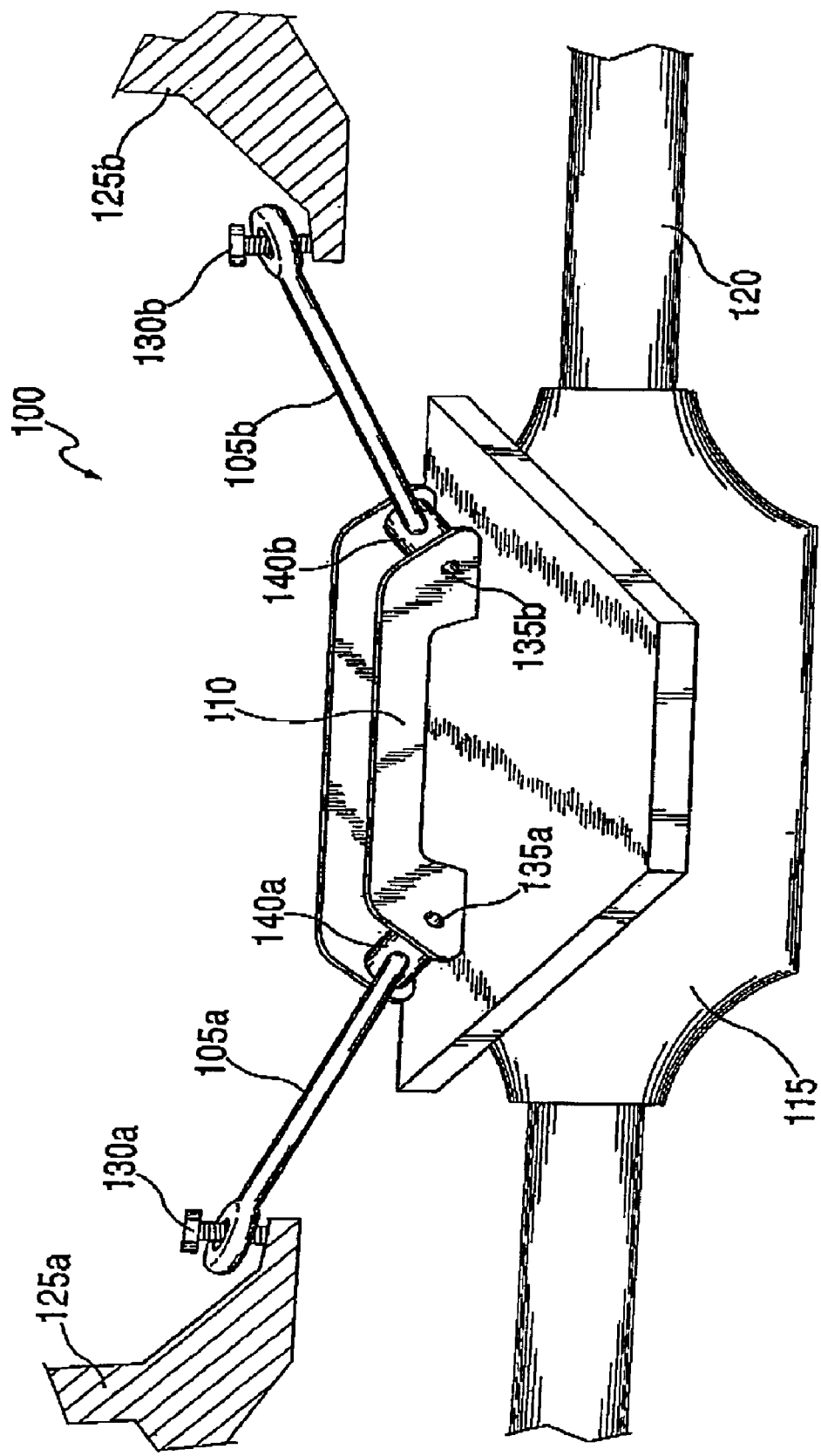
FIG. 1 illustrates a linked suspension in a fully rebounded state.
Figure 2:
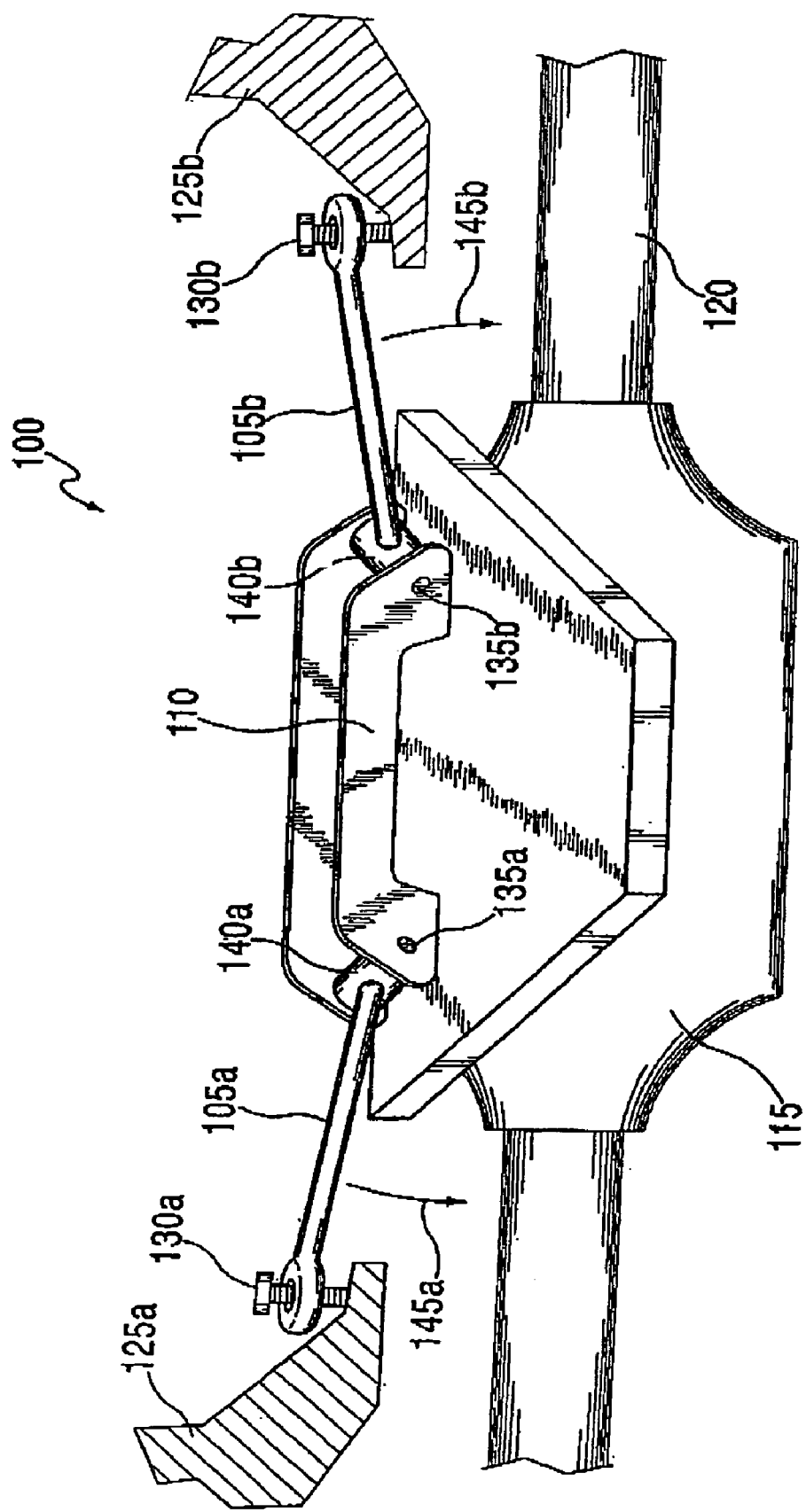
FIG. 2 illustrates a linked suspension of a vehicle resting on the ground.
Figure 3:
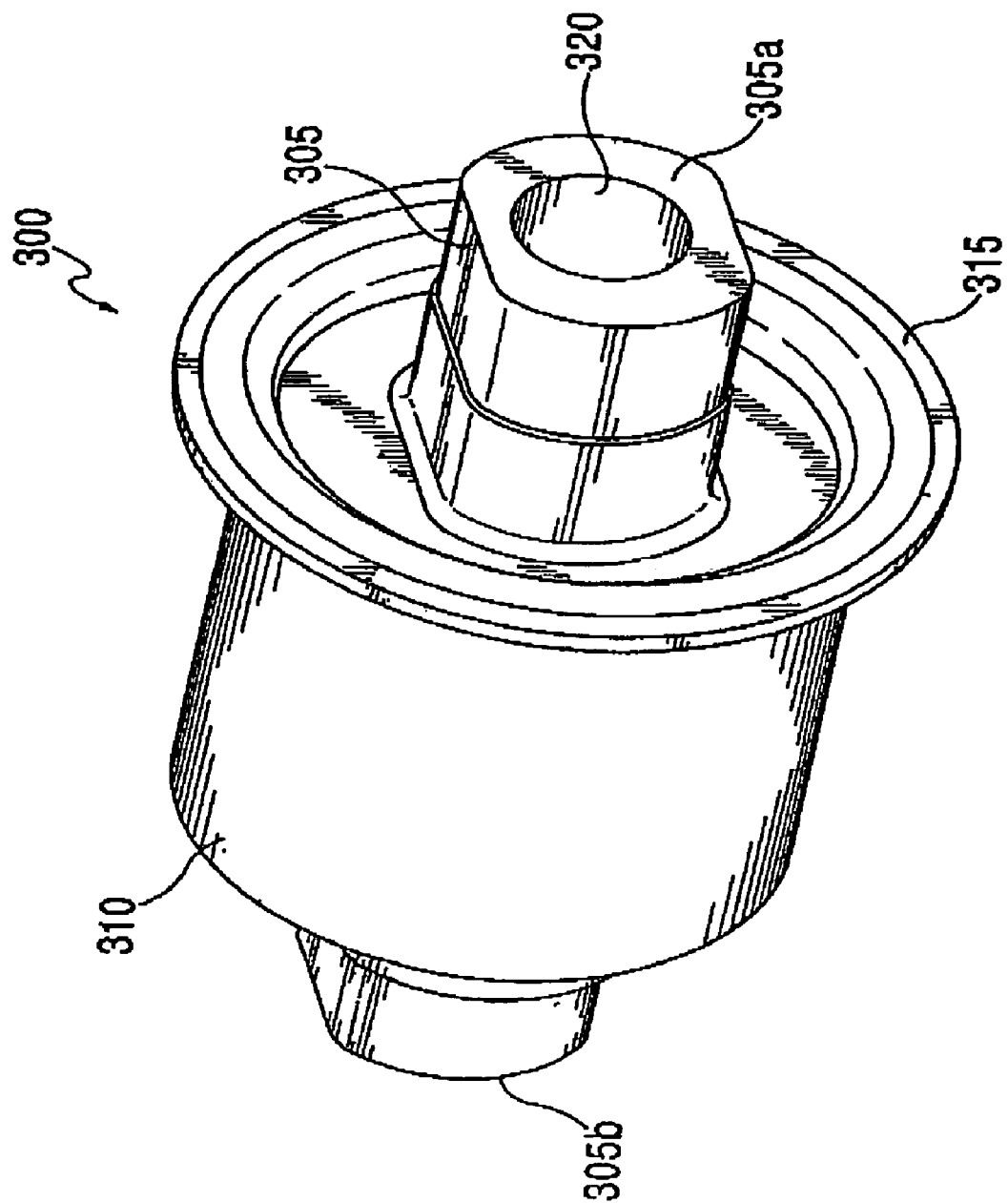
FIG. 3 illustrates a bushing for a linked suspension.
Figure 7:
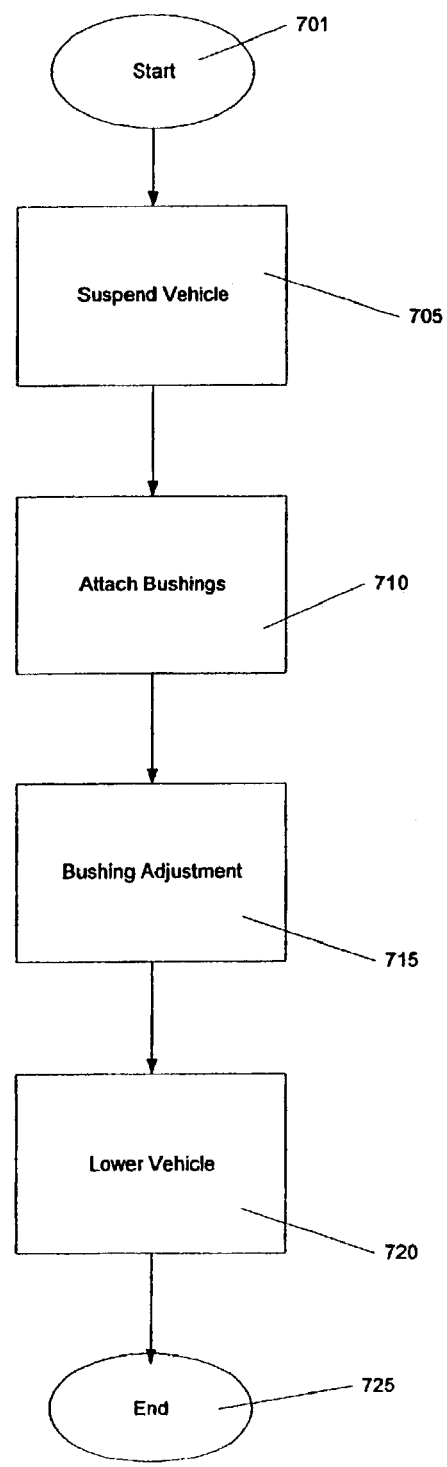
FIG. 7 is a block diagram showing the operational sequence of an exemplary method according to the present invention.

Referring now to FIG. 7, there is seen an exemplary operational sequence 700 according to the present invention for assembling a four-link suspension 100. As shown in FIG. 7, the sequence begins at start step 701 and proceeds to suspension step 705, in which a vehicle, for example, an automobile, is suspended above an assembly area. As described above, once the vehicle is in a suspended position, the four-link suspension assumes a fully rebounded state, as shown in FIG. 1. After the vehicle is suspended above the assembly area, step 710 is executed, in which bushings 140a, 140b are loosely attached to the bracket 110. Then, bushing adjustment step 715 is executed, in which the tube element 305 of each of the bushings 140a, 140b is adjusted to compensate for a subsequent torque to be produced when the vehicle is lowered from the suspended state. Then, step 720 is executed, in which the vehicle is lowered from the suspended state to the ground. Finally, operational sequence 700 ends at end step 725.

It should be appreciated that the above-described operational sequence 700 according to the present invention prevents disadvantageous prestressing of the bushings 140a, 140b, without the need for a lifting device. This may be accomplished by the bushing adjustment step 715, to be described in more detail below.

Figure 4A:
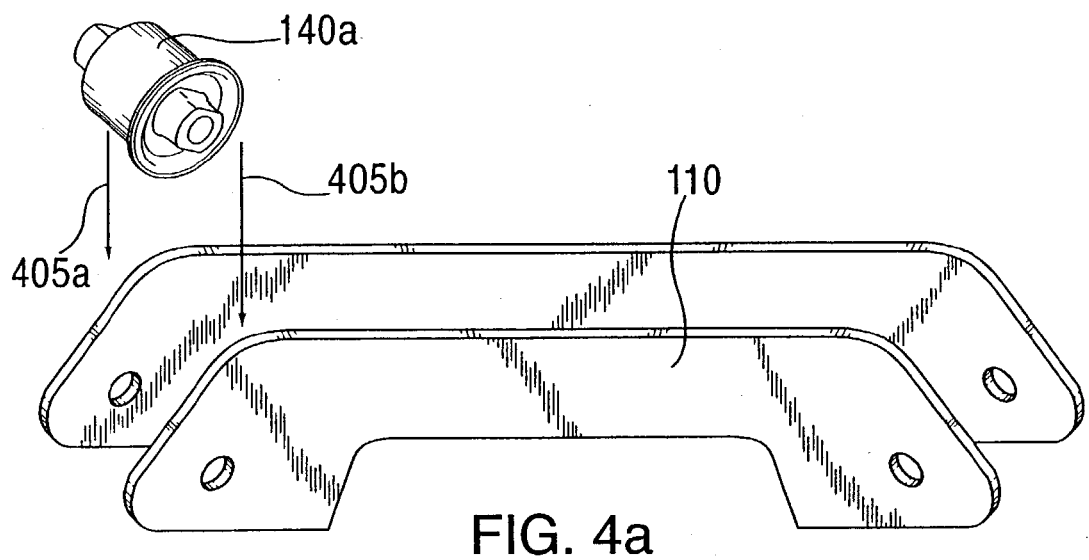
FIGS. 4a–4c illustrate an exemplary operational sequence according to the present invention for loosely attaching a bushing to a bracket.
Figure 4B:
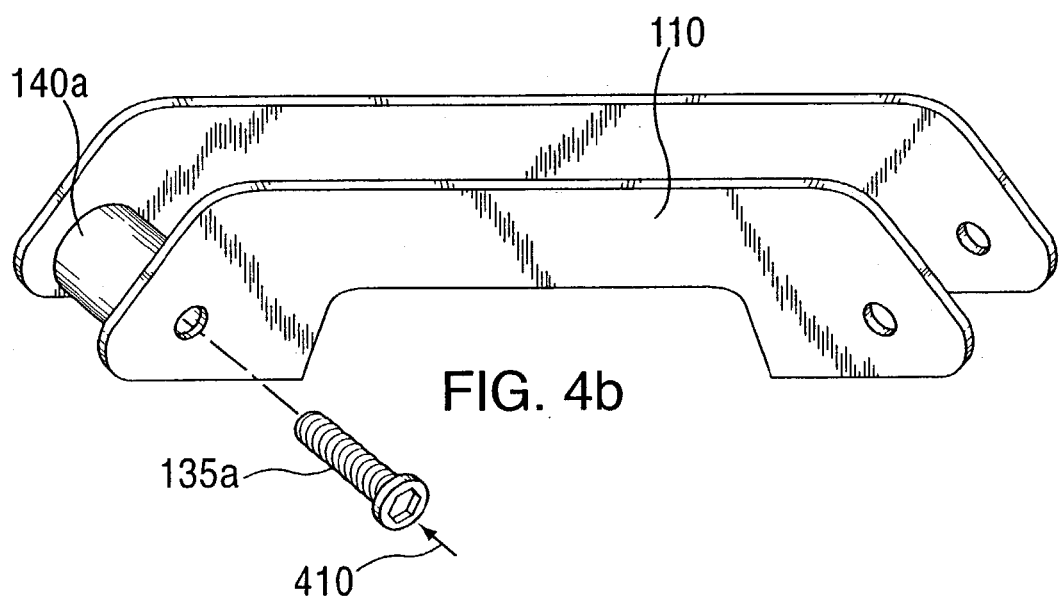
Figure 4C:
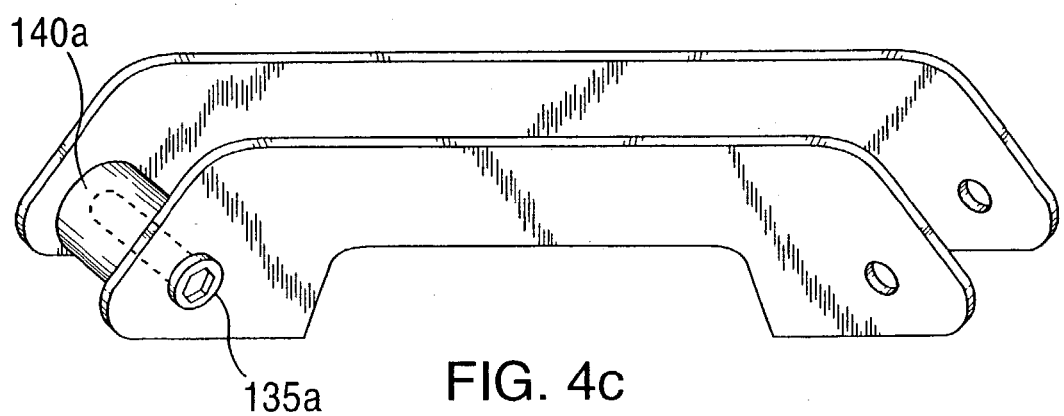

Referring now to FIGS. 4a–4c, there is seen an exemplary operational sequence for step 710 to loosely attach the bushing 140a to bracket 110 in a fully rebounded state of the four-link suspension 100. It should be appreciated that, although FIGS. 4a–4c illustrate only bushing 140a, a similar sequence 710 may be employed to loosely attach bushing 140b to bracket 110.

As shown in FIG. 4a, bushing 140a is inserted into the bracket 110 in the direction of arrows 405a, 405b. Once properly aligned within the bracket 110, bolt 135a is inserted through the bracket and tube element 305 of the bushing 140a, as shown in FIGS. 4b and 4c. However, the bolt 135a is not tightened during the operational sequence for step 710. In this manner, the bolt 135a keeps bushing 140a properly aligned, while permitting the bushing 140a to rotate freely with respect to the bracket 110.

Figure 5A:
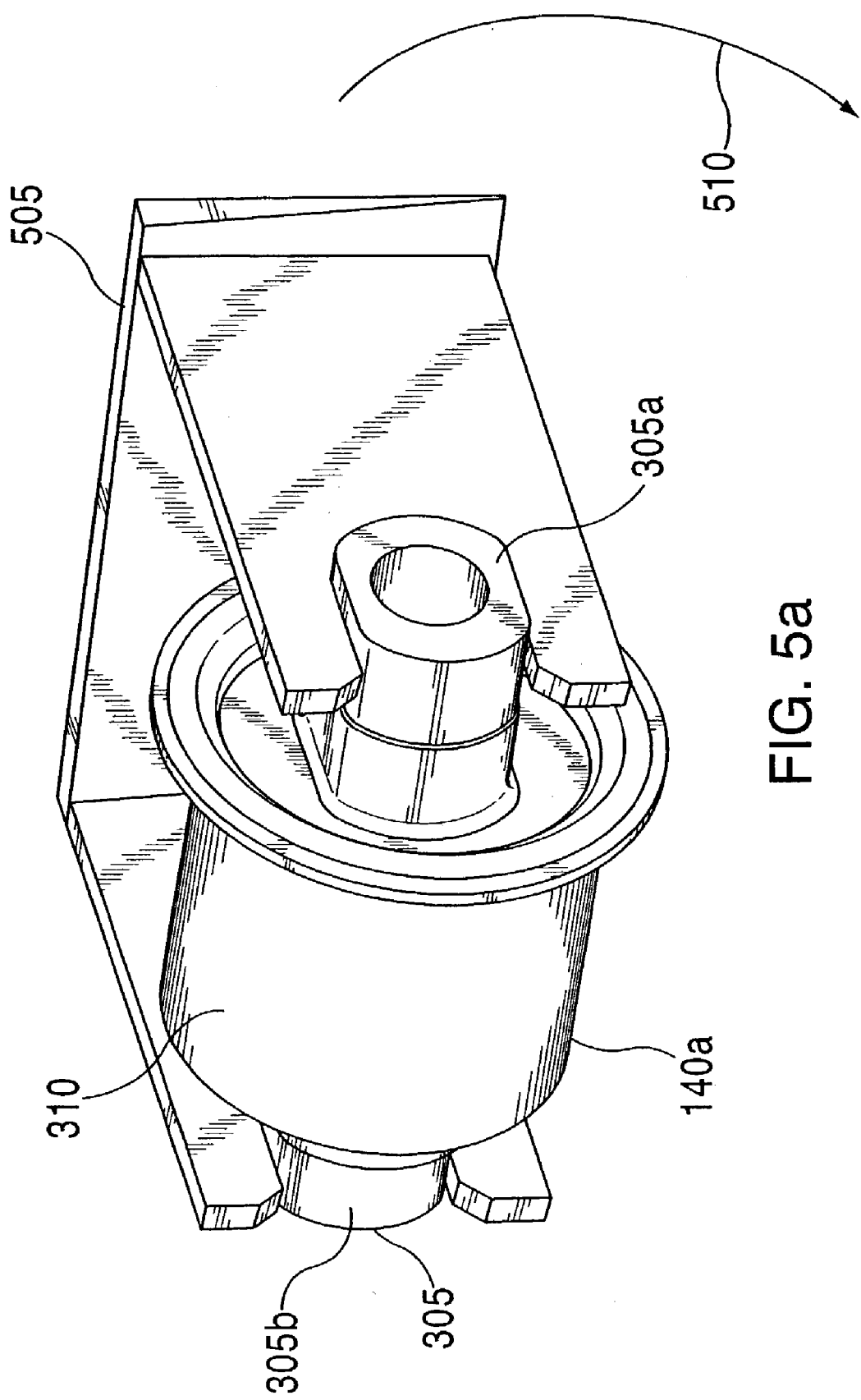
FIG. 5a illustrates an exemplary assembly tool according to the present invention detachably coupled to a bushing.

Once the bolt 135a is loosely positioned through the bushing 140a, step 715 of the operational sequence 700 is executed, in which the tube element 305 of each of the bushings 140a, 140b is adjusted to compensate for a subsequent torque to be produced on the tube element 305 when the vehicle is lowered from the suspended state. For this purpose, an exemplary assembly tool 505 according to the present invention may be aligned with the tube of the bushing 140a, as shown in FIG. 5a. The assembly tool includes at least one torque-producing arm and a connection end configured to detachably couple to ends 305a, 305b of the tube element 305.

Figure 5B:
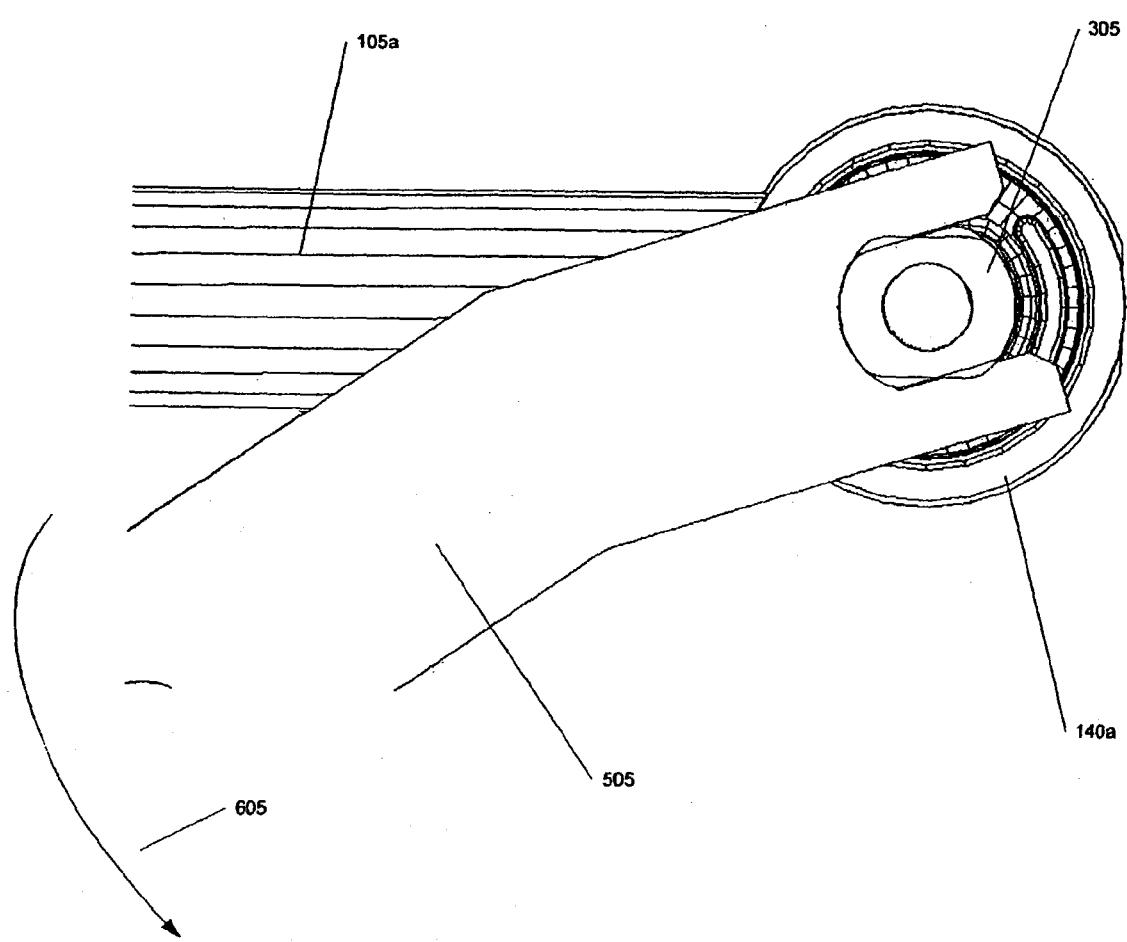
FIG. 5b illustrates the exemplary assembly tool of FIG. 5a rotated downward by a predefined angular degree.

Once coupled to the the tube element 305, assembly tool 505 is rotated downward in the direction of arrow 510, as shown in FIG. 5b. As the assembly tool 505 is rotated, the outer sleeve 310 of bushing 140a is kept stationary by upper control arm 105a, and the resilient material (not shown) within the outer sleeve 310 of the bushing 140a, produces a counter torque on the tube element 305 opposing the rotation. In this manner, the assembly tool 505 acts to "simulate" the effects of the lifting device (not shown) on the tube element 305.

After the assembly tool 505 is rotated downward in the direction of arrow 610, the bolt 135a may be tightened (i.e., torqued), thereby fixedly securing the tube 305 of the bushing 140a to the bracket 110. Once the bushing 140a is fixedly secured to the bracket 110 via the bolt 135a, the assembly tool 505 may be removed.

In accordance with another exemplary embodiment of the present invention, the assembly tool 505 is rotated downward in the direction of arrow 605 by a predefined angular degree, which may be, for example, constant with respect to a particular vehicle type (e.g., 14 degrees for a particular type of vehicle).

Figure 6:
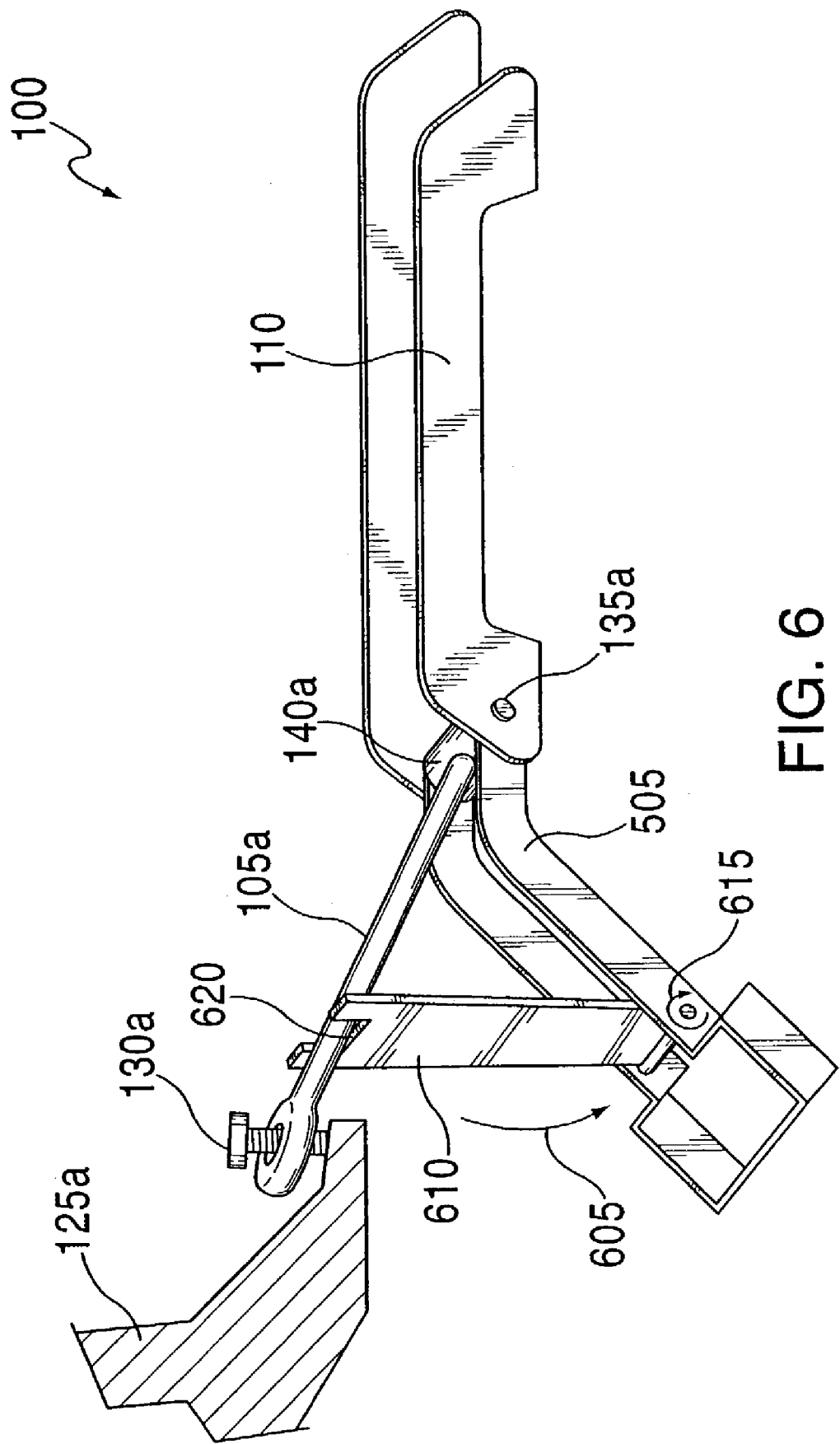
FIG. 6 illustrates the assembly of a linked-suspension using an exemplary assembly tool according to the present invention.

Referring now to FIG. 6, there is seen another exemplary assembly tool according to the present invention having an angular stop arrangement 610 configured to suitably position the assembly tool 505 at the predefined angular degree. As shown in FIG. 6, the angular stop arrangement 610 may include, for example, a stop bar rotatably mounted to the assembly tool 505. The stop bar 610 may be rotated in the direction of arrow 615 and may be configured to engage with, for example, a notch 620 of the upper control arm 105a.

In accordance with yet another exemplary embodiment according to the present invention, stop bar 610 is manufactured to a specific length, such that the assembly tool 505 is rotated to the predefined angular degree once the stop bar 610 engages, for example, the notch 620 of the upper control arm 105*a*. In this manner, the assembly person need not manually measure the predefined angular degree before tightening the bushing 140*a* via bolt 135*a*.

What is claimed is:

1. A method for assembling a linked suspension, comprising:
   positioning at least one bushing within a bracket, the bushing including an outer sleeve and a tube extending therethrough, the tube being rotatable with respect to the outer sleeve of the bushing against a counter torque;
   providing an assembly tool having a coupling end and a torque-producing arm;
   coupling the assembly tool to the tube;
   rotating the tube with respect to the outer sleeve of the bushing; and
   tightening the bushing to the bracket after rotating the tube with respect to the outer sleeve.

2. The method according to claim 1, wherein the at least one bushing includes a resilient material arranged within the outer sleeve and connected to the tube, the resilient material producing the counter torque.

3. The method according to claim 2, wherein the resilient material includes rubber.

4. The method according to claim 1, wherein the tube includes at least one of steel, aluminum, and a polymer.

5. The method according to claim 1, wherein the rotating of the tube with respect to the outer sleeve is performed by applying torque to the torque-producing arm of the assembly tool.

6. The method according to claim 1, wherein the rotating of the tube with respect to the outer sleeve is performed while the linked suspension is in a fully rebounded state.

7. The method according to claim 1, wherein the outer sleeve of the bushing is kept essentially stationary via a control arm while the tube is rotated with respect to the outer sleeve.

8. The method according to claim 1, wherein the tightening of the bushing to the bracket includes tightening a bolt positioned through the bracket and the tube of the bushing.

9. The method according to claim 1, wherein the rotating of the tube with respect to the outer sleeve is performed through a predefined angular degree.

10. The method according to claim 9, wherein the predefined angular degree is 14 degrees.

* * * * *